May 20, 1924.　　　　　L. M. ASPINWALL　　　　　1,494,401

MOTOR CONTROL SYSTEM

Filed Sept. 23, 1921

WITNESSES:　　　　　　　　　　　　　　　　　　　INVENTOR
　　　　　　　　　　　　　　　　　　　　　　　　Louis M. Aspinwall
　　　　　　　　　　　　　　　　　　　　　　　　BY
　　　　　　　　　　　　　　　　　　　　　　　　ATTORNEY Patented May 20, 1924.

1,494,401

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed September 23, 1921. Serial No. 502,637.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Motor-Control Systems, of which the following is a specification.

My invention relates to motor-control systems and it has particular relation to control systems employed to govern the motors of a trackless trolley or other vehicle that is provided with a plurality of current-collecting devices.

One object of my invention is to provide means for preventing a difference of potential existing between the vehicle body and ground during normal operation and additional protective means for disconnecting the control system from a source of electrical energy, when one of a plurality of current-collecting devices becomes disengaged from a corresponding supply conductor.

Another object of my invention is to provide a motor-control system that shall be simple and economical in construction and positive and reliable in operation.

Heretofore, when one of a plurality of trolley poles of a vehicle became disengaged from a corresponding trolley conductor and another trolley pole remained in engagement with another trolley conductor, there was possibility of establishing a difference of electrical potential between the vehicle frame and ground. This possibility is a source of danger to passengers, particularly upon rainy days when they are getting in and out of the vehicle.

Briefly speaking, my invention consists in providing an automatic device for opening the motor circuits adjacent to the current-collecting devices—such, for example, as trolley poles of a trackless vehicle—when one of the devices becomes disengaged from a corresponding source of electrical energy. It also consists in providing means for automatically connecting the metallic car body to that conductor which is of low potential, relatively to the Ground, thereby tending to maintain the car body at Ground potential.

Figure 2:
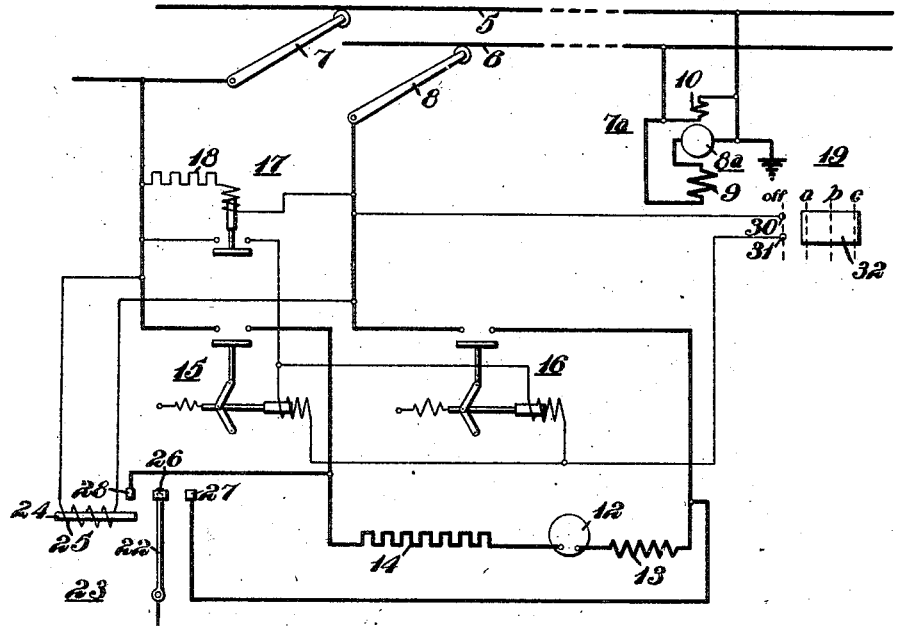
Figures 1, 3:
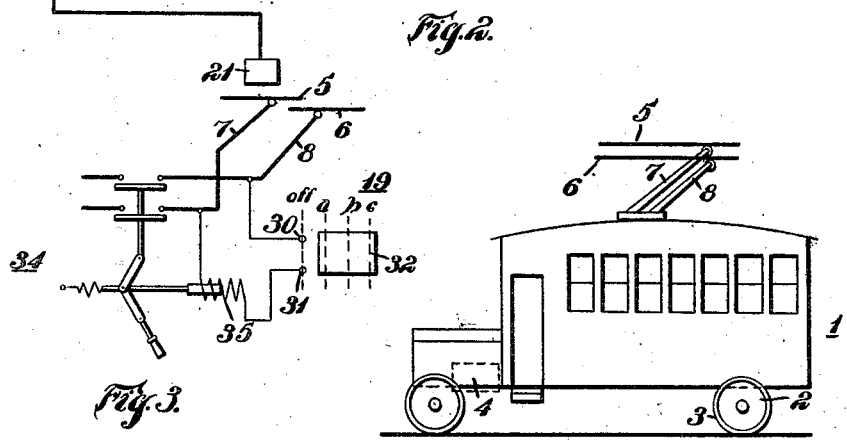

For a better understanding of my invention, reference may be made to the accompanying drawing, Fig. 1 of which is a view, in side elevation, of a trackless trolley employing a motor-control system designed in accordance with my invention;

Fig. 2 is a schematic view of the motor-control system employed to operate the motor of the trackless trolley illustrated in Fig. 1; and Fig. 3 is a schematic view of a modified form of control system embodying my invention.

Referring particularly to Fig. 1 of the drawing, a trackless-trolley vehicle body 1 is mounted upon a plurality of wheels 2, which are provided with suitable cushion or pneumatic tires 3. The metallic body 1 is insulated from the Ground by the tires 3.

The vehicle 1 is driven by a motor 4 and driving mechanism, (not illustrated) which is actuated thereby. The motor 4 is supplied with energy from a plurality of conductors 5 and 6 of different potential through the trolley poles 7 and 8. The trolley poles or current-collecting devices may be connected to the conductors 5 and 6 in the manner illustrated in Fig. 1 of the drawing, or their connection may be reversed.

Referring particularly to Fig. 2 of the drawing, the conductors 5 and 6 are supplied with electrical energy from a generator $7a$ situated at some point relatively remote from the vehicle. The generator $7a$ has an armature $8a$, a series field-magnet winding 9 and a shunt field-magnet winding 10. The terminal of the armature $8a$ that is connected to the conductor 5 is also connected to Ground. In other words, the conductor 5 constitutes a return portion of the circuit.

The motor 4, which is mounted upon the vehicle body 1 is provided with an armature 12 and a series field-magnet winding 13. A starting resistor 14, which is in series relation with the armature 12 of the motor 4, may be shunted, by a plurality of contactors, in any well known manner. For the sake of clearness, the contactors for shunting the starting resistor 14 have been omitted.

A plurality of circuit breakers 15 and 16 are provided for connecting the motor 4 to the current-collecting devices 7 and 8. These circuit breakers 15 and 16 are situated relatively adjacent to the current-collecting devices 7 and 8 in order that, upon their opening, the amount of conductor in electrical contact with collectors 7 and 8 is reduced to a minimum and there is less danger of current leakage being established from whichever current-collecting device happens to be of higher potential to the metallic frame of the trackless trolley.

A relay 17, which has its actuating coil directly connected, in series relation with an auxiliary resistor 18, to the current-collecting devices 7 and 8, is employed to govern the opening of the circuit breakers 15 and 16 when one of the current-collecting devices 7 and 8 becomes detached from the corresponding trolley conductor 5 or 6.

The control system is provided with a controller 19 having an "off" position and a plurality of operating positions $a$, $b$ and $c$. Only that portion of the controller 19 has been illustrated which is considered necessary to properly explain the invention.

For maintaining the vehicle body 1 at Ground potential, a metallic plate 21 constituting a part of the metallic vehicle body 1, is electrically connected to a pivotally mounted armature member 22 of a polarized relay device 23. A core member 24, which is provided with a coil 25, is employed to govern the movement of the armature member 22. The actuating coil 25 of the relay 23 has its terminals connected directly to the current-collecting devices 7 and 8. The armature member 22 is provided with a movable contact member 26, which is adapted to engage either of a plurality of stationary contact members 27 and 28, in accordance with the direction of movement of the armature member 22.

The stationary contact member 27 is connected, through the circuit breaker 16, to the current-collecting device 8, and the stationary contact member 28 is connected, through the circuit breaker 15, to the current-collecting device 7.

When the current-collecting devices 7 and 8 are connected to the conductors 5 and 6, as illustrated in the drawing, the north and south poles of the core member 24 will be in opposite relation to that in which the poles will be when the current-collecting devices 7 and 8 are connected respectively to the conductors 6 and 5. The polarized relay 23 is, therefore, designed to effect movement of the armature member 22 toward that one of the stationary contact members 27 and 28, which is connected to the conductor 5 (the latter being of substantially of Ground potential) when the circuit breakers 15 and 16 are closed.

In event of leakage becoming established from any point in the control system, including the motor 4, the vehicle body 1 will be maintained at substantially Ground potential by the polarized relay 23 connecting the frame at plate 21 to Ground conductor 5.

When the master controller 19 is actuated from its "off" position to position $a$, $b$ or $c$, a circuit is established from conductor 6 through current-collecting device 8, control fingers 30 and 31, which are bridged by the contact segment 32 of the master controller 19, parallel-connected actuating coils of circuit breakers 15 and 16, contact member of the relay 17, which is normally closed, and current-collecting device 7 to Ground conductor 5.

If either of the current-collecting devices 7 and 8 becomes detached from the corresponding supply conductor 5 or 6, the relay 17 will open, thereby breaking the circuits of the actuating coils of the circuit breakers 15 and 16, permitting them to drop open and thus de-energize the control system.

When the detached trolley pole is replaced in its proper position, the relay 17 will close and, if the master controller 19 is in one of its operative positions, the circuit breakers 15 and 16 will reclose.

Referring particularly to Fig. 3, a single circuit breaker 34 is provided for breaking the circuit from the supply conductors 5 and 6 to the motor 4. The circuit breaker 34 is relatively adjacent to the current-collecting devices 7 and 8 and is provided with an actuating coil 35 having its one terminal connected directly to the current-collecting device 7 and its other terminal connected to the control finger 31 of the master controller 19, which is similar to the master controller illustrated in Fig. 2 of the drawing. The control finger 30 of the master controller 19 is connected directly to the current-collecting device 8.

When the master controller 19 is actuated from its "off" position to any of its operative positions $a$, $b$ or $c$, a circuit is established from the trolley conductor 6 through the current-collecting device 8, control fingers 30 and 31, which are bridged by contact segment 32 of master controller 19, actuating coil 35 of the circuit breaker 34 and current-collecting device 7 to the trolley conductor 5.

If either of the trolleys 7 and 8 becomes detached from the corresponding conductor 5 or 6, the actuating coil 35 of circuit breaker 34 will become de-energized, thereby permitting the circuit breaker 34 to assume its open position. If the master controller 19 is maintained in one of its operative positions, the circuit breaker 34 will close as soon as the detached trolley pole 7 or 8 is returned to its proper position.

From the above description, it is apparent that I have provided means for protecting the metallic car body of a trackless vehicle from having a different potential from the Ground during normal operation and I have provided means for completely de-energizing the control system when one of the current-collecting devices of the vehicle becomes detached from the corresponding trolley conductor.

While I have shown my invention in its preferred form, it is apparent that modifications may be made in the arrangement of circuits and apparatus employed without departing from the spirit of my invention. I desire, therefore, to be limited only by the scope of the appended claims.

I claim as my invention:

1. In a motor-control system, the combination with a translating device, of a plurality of current-collecting devices, means for connecting said translating device in circuit with said collecting devices and means for interrupting said circuit relatively adjacent to each of said collecting devices when one of said collecting devices becomes inoperative.

2. In a control system, the combination with a translating device, of a plurality of current-collecting devices, means for connecting said translating device in circuit with said collecting devices and means comprising said first means for interrupting said circuit relatively adjacent to each of said collecting devices when one of said collecting devices becomes inoperative.

3. In a control system, the combination with a translating device, of a plurality of current-collecting devices, means for connecting said translating device to each of said collecting devices concurrently and automatic means for rendering said first means inoperative when one of said collecting devices becomes de-energized.

4. In a control system, the combination with a translating device, of a plurality of current-collecting devices, a plurality of switches for connecting the translating device to said collecting devices relatively adjacent thereto, a controller for governing said switches, and means for opening said switches when either of said current-collecting devices becomes de-energized.

5. In a control system, the combination with a motor, of a plurality of current-collecting devices, means for connecting said motor to each of said devices concurrently and automatic means for rendering said first means inoperative when one of said devices becomes improperly positioned.

6. In a control system, the combination with a motor, of a plurality of current-collecting devices, means for connecting said motor to each of said devices, automatic means for rendering said first means inoperative when one of said devices becomes improperly positioned, said automatic means becoming inoperative upon said device resuming its proper position.

7. In a control system, the combination with a translating device, of a plurality of current-collecting devices, a plurality of line switches for connecting said translating device to said collecting devices, and means comprising a relay having an actuating coil for opening said switches when one of said collecting devices becomes improperly positioned, said relay having its actuating coil connected to one of said collecting devices.

8. In a control system, the combination with a translating device, of a plurality of current-collecting devices, a line switch for connecting said translating device to said collecting devices, and means comprising a relay for opening said switches when one of said collecting devices becomes improperly positioned, said relay having its actuating coil connected to both of said collecting devices.

9. The combination with a vehicle body and means for insulatably mounting said body, of a motor mounted upon said body, a plurality of conductors of different potentials, a plurality of current-collecting devices adapted to engage either of said conductors, means for connecting said motor to said devices, and automatic means for connecting said device to that conductor which is of low potential relatively to Ground prior to the operation of said first means.

10. The combination with a vehicle body and means for insulating said body, of a motor mounted upon said body, a plurality of conductors of different potentials, a plurality of current-collecting devices adapted to engage either of said conductors, means adjacent to said devices for connecting said motor to said devices, automatic means for rendering said connecting means inoperative when one of said devices becomes improperly positioned, and automatic means for connecting said body to that conductor which is of low potential relatively to Ground prior to operation of said connecting means.

In testimony whereof, I have hereunto subscribed my name this 14th day of September, 1921.

LOUIS M. ASPINWALL.